US010755403B2

United States Patent
Safai

(10) Patent No.: US 10,755,403 B2
(45) Date of Patent: Aug. 25, 2020

(54) APPARATUS AND METHODS FOR SHOT PEENING EVALUATION

(71) Applicant: The Boeing Company, Chicago, IL (US)

(72) Inventor: Morteza Safai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 16/104,394

(22) Filed: Aug. 17, 2018

(65) Prior Publication Data

US 2020/0058119 A1   Feb. 20, 2020

(51) Int. Cl.
   *G06T 7/00* (2017.01)
   *C21D 7/06* (2006.01)

(52) U.S. Cl.
   CPC ............... *G06T 7/0006* (2013.01); *C21D 7/06* (2013.01); *G06T 2207/20221* (2013.01); *G06T 2207/30136* (2013.01)

(58) Field of Classification Search
   CPC ... G06T 2207/0004; G06T 2207/30108; G06T 7/001; G06T 11/60; G06T 7/0004; C23C 14/185; C23C 14/54; G02B 1/10; G01N 21/8851
   USPC ......... 382/108, 300, 147; 384/457; 345/419, 345/103
   See application file for complete search history.

(56) References Cited

U.S. PATENT DOCUMENTS

| 2007/0065061 A1* | 3/2007 | Terada ............... F16C 33/60 384/457 |
| 2016/0253793 A1* | 9/2016 | Marrion ............. G06T 7/0008 382/141 |

FOREIGN PATENT DOCUMENTS

| JP | 2017111121 | 6/2017 |
| JP | 6335548 | 5/2018 |

OTHER PUBLICATIONS

Prevey, "X-Ray Diffraction Characterization of Residual Stresses Produced by Shot Peening," Lambda Technologies, Shot Peening Theory and Application, series ed. A. Niku Lari, IITT-International, Gournay-Sur-Marne, France, 1990, pp. 81-93.

Leon, F. Puente, "Determination of the Coverage of Shot Peened Surfaces," Conference on Surface Treatment, Jun. 20, 2001, Seville, Spain, pp. 1-10, 10 pages.

European Patent Office, "Extended European Search Report," issued in connection with European Application No. 19185377.9, dated Nov. 20, 2019, 9 pages.

* cited by examiner

Primary Examiner — Phuoc H Doan
(74) Attorney, Agent, or Firm — Hanley, Flight & Zimmerman, LLC

(57) ABSTRACT

Apparatus and methods for shot peening evaluation are disclosed herein. An example apparatus for evaluating a surface that has undergone a shot peening process includes a camera to generate first image data of a first portion of the surface. The example apparatus includes a processor to determine an impact coverage value for the first portion based on the first image data and determine an effectiveness of the shot peening process for the surface based on the impact coverage value.

20 Claims, 7 Drawing Sheets

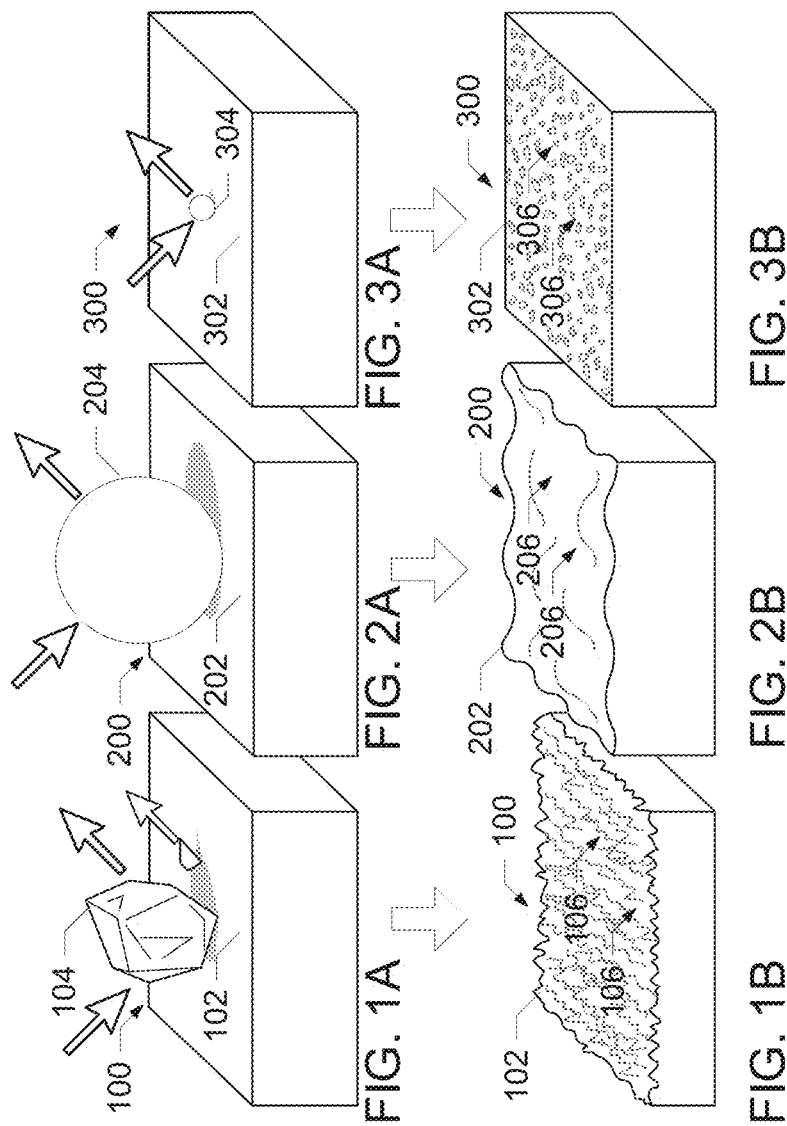

APPARATUS AND METHODS FOR SHOT PEENING EVALUATION

FIELD OF THE DISCLOSURE

This disclosure relates generally to shot peening and, more particularly, to methods and apparatus for shot peening evaluation.

BACKGROUND

Shot peening includes impacting (e.g., shooting, bombarding) a surface of a metallic material with pellets of metal or glass to modify mechanical properties of the material. Shot peening can be used to increase residual stresses of the material, thereby improving the response of the material to, for instance, fatigue.

BRIEF DESCRIPTION OF THE DRAWINGS

FIGS. 1A-3B depict various shot peening techniques and resulting effects on materials that have been shot peened.

The figures are not to scale. Instead, the thickness of the layers or regions may be enlarged in the drawings. In general, the same reference numbers will be used throughout the drawing(s) and accompanying written description to refer to the same or like parts.

SUMMARY

Figure 4:
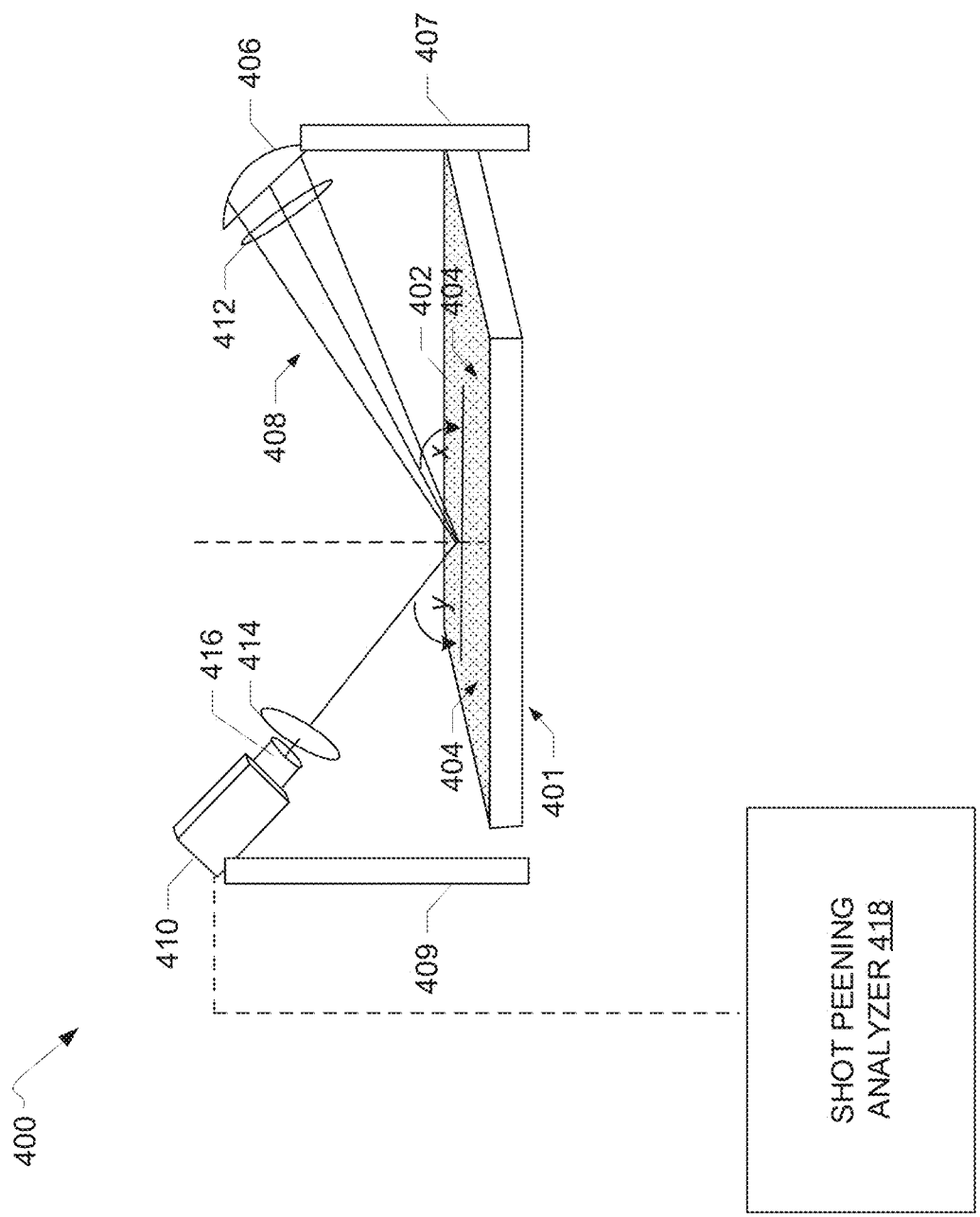
FIG. 4 illustrates an example system including a digital camera for generating image data for a surface that has undergone shot peening and a shot peening analyzer for evaluating the surface based on the image data in accordance with teachings disclosed herein.

An example apparatus for evaluating a surface that has undergone a shot peening process includes a camera to generate first image data of a first portion of the surface. The example apparatus includes a processor to determine an impact coverage value for the first portion based on the first image data. and determine an effectiveness of the shot peening process for the surface based on the impact coverage value Another example apparatus disclosed herein includes an image analyzer to generate pixel data based on image data received from a camera. The image data representative of at least a portion of a surface that has undergone a shot peening process. The example apparatus includes an evaluator to perform a comparison of the pixel data to a threshold and a communicator to output an indicator of an effectiveness of the shot peening process relative to the at least the portion of the surface based on the comparison.

An example method disclosed herein includes analyzing, by executing an instruction with a processor, image data for one or more portions of a surface that has undergone a shot peening process. The example method includes determining, by executing an instruction with the processor, an impact coverage value for the one or more portions of the surface based on the image data. The example method includes determining, by executing an instruction with the processor, a uniformity of a coverage of the one or more portions of the surface during the shot peening process based on the impact coverage value.

DETAILED DESCRIPTION

Shot peening includes impacting (e.g., shooting, bombarding) at least a portion of a surface of a metallic material with, for instance, metal pellets or glass beads to modify one or more mechanical properties of the material. Shot peening can be used as part of a manufacturing process to increase a strength of the material by exposing the material to stress by creating a compressive residual stress layer in the material. The impact of the pellets or beads at high speeds with the surface forms indentations or dimples on the surface. As a result of the exposure to of the material to impact stresses, the material is strengthened. Thus, shot peening improves a resistance of the material to fatigue, cracking, and corrosion.

During a manufacturing process of a production part including a metallic material, a manufacturer may rely on shot peening to enable the metallic material to provide a certain amount of strength to the production part. For example, a manufacture may desire to obtain 20% of the strength of the production part from shot peening the metallic material. However, if the shot peening process does not result in consistent or substantially consistent coverage of the surface of the material as indicated by the formation of dimples in the material, the strength requirements of the production part including the shot peened material may not be met. As a result, the production part could be subject to cracks, failure, etc. Thus, evaluating an effectiveness of the shot peening process with respect to consistency or uniformity of the surface impact coverage can help verify that engineering requirements for a production part are being met.

Known methods of evaluating the effectiveness of a shot peening process for a material include visually inspecting the surface of the material that was shot peened with the naked eye to identify areas of the surface in which dimples were not formed and to assess the overall consistency of coverage of the surface with dimples. However, such visual inspection methods are subjective in that evaluations of the surface can vary between persons performing the inspections based on, for instance, a person's eyesight capabilities and ability to discern features of the surface as well as the person's subjective interpretation of what is considered substantially uniform coverage. Further, applying objective standards such as counting a number of indented or raised portions on the surface is not efficient for large surfaces that have undergone shot peening; moreover, such standards can be difficult to set for a surface due to the unpredictable manner in which the pellets impact the surface. Also, an inspector can only view a portion of the surface in detail. Therefore, to inspect a large surface (e.g., a production part such as an aircraft stringer having a length of 120 feet), the inspector must walk around the part to inspect different portions of the surface and may not be able to sufficiently view all of the portions (e.g., center portions of the surface), even with the assistance of a flashlight.

Some known shot peening inspection methods include gages (e.g., Almen gages), microscopes, and/or other visual coverage checking tools to evaluate the surface that has been shot peened. For instance, shot peening can be applied to an Almen strip (e.g., a test sample of metal) and the strip can be analyzed using an Almen gage to measure the intensity of impact of the pellets and verify that the shot peening machine is operating as expected prior to shot peening the surface of the production part. However, tools such as gages or microscopes only examine a small sample of the surface that has been shot peened. Examining a representative sample of the surface may not accurately reflect the effectiveness of the shot peening process with respect to a remainder of the surface, particularly for large surfaces.

Some known shot peening inspection methods use parameters such as residual stress as a measure of an effectiveness of a shot peening process. For example, x-ray diffraction can be used to measure residual stress via penetration of an x-ray beam into a surface that has been shot peened. However, as with the visual inspection techniques mentioned above, x-ray diffraction is limited to analysis of a relatively small, representative sample of the shot peened surface.

Example systems and methods disclosed herein provide for an optical inspection system to evaluate an effectiveness of a shot peening process on a surface with respect to consistency or uniformity of coverage of the surface with indentations or dimples due to shot peening. Examples disclosed herein include one or more cameras to capture images of a surface that has undergone a shot peening process. Examples disclosed herein analyze image data (e.g., pixel data) to determine an impact coverage value of the shot peened surface as a result of the shot peening process. For instance, examples disclosed herein analyze black and white pixel data to determine a percentage of coverage of the surface with dimples relative to a predefined coverage threshold. Based on the comparison, examples disclosed herein evaluate the effectiveness of the shot peening process and output, for instance, alerts indicting that the shot peening coverage for the surface fails to meet the predefined coverage criteria. Using the image data, examples disclosed herein can detect and output indications of area(s) of the surface that were missed during the shot peening process or that had incomplete (e.g., light) coverage as compared to other areas and/or the predefined criteria. Thus, examples disclosed herein provide for objective evaluations of the consistency of the shot peening process across a surface.

Examples disclosed herein include one or more illumination sources, such light-emitting diode(s), to illuminate the surface during the capture of the image(s) by the camera(s). Examples disclosed herein include optical diffuser(s) to facilitate uniform or substantially uniform diffusion of the light from the illumination source(s). The optical diffuser(s) reduce the effects of non-uniform light (e.g., glare), which can skew the analysis of the image data by causing areas of darkness on an already non-uniform (e.g., dimpled) surface.

Examples disclosed herein can be used to evaluate large areas of shot-peened surfaces as compared to known examples, which are limited to either discrete test samples (e.g., an Almen strip) or small samples of the surface viewed with the naked eye or through a microscope lens. In examples disclosed herein, a plurality of images of one or more portions of the shot peened surface can be captured and combined to analyze coverage of a greater amount of the surface than would possible based on human eyesight capabilities or microscope lenses alone. For instance, examples disclosed herein can be used to evaluate a shot peened surface across a 120 foot stringer for an aircraft. Thus, examples disclosed herein improve the objectiveness of the shot peening inspection as well as the amount of the surface that is evaluated using the objective criteria.

Turning now to the figures, FIGS. 1A-3B depict various shot peening techniques and the resulting effects of the shot peening process on a surface of a material. For example, FIG. 1A illustrates a first metal part 100, which can be made of, for instance, aluminum or another metal. The first metal part 100 can be a component of, for instance, a stringer of an aircraft. As shown in FIG. 1A, a first (e.g., top) surface 102 of the metal part 100 is impacted by a pellet 104. For illustrative purposes, only one pellet is shown in FIG. 1 with the understanding that during the shot peening process, the first surface 102 is bombarded with a plurality of pellets 104. As illustrated in FIG. 1B, as a result of the impact of the pellets 104 with the first surface 102, a plurality of indentations or dimples 106 are formed in the first surface 102.

FIGS. 2A and 2B illustrate a second metal part 200 having a first surface 202. As shown in FIGS. 2A and 2B, when the second metal part 200 is impacted by pellets 204, indentations 206 are formed in the first surface 202. The shape of the respective indentations 106, 206 illustrated in FIGS. 1B and 2B differ based on the shapes of the pellets 104, 204. For example, the pellet 204 of FIG. 2A is larger and substantially spherical and creates a wave-like texture in the first surface 202 of the second metal part 200. This wave-like texture shown in FIG. 2B differs from the shape of the indentations formed in the first surface 102 of the first metal part 100 of FIG. 1B due to the irregularly shaped pellet 104.

FIGS. 3A and 3B illustrate a third metal part 300 having a first surface 302. As shown in FIGS. 3A and 3B, when the third metal part 300 is impacted by pellets 304, indentations 306 are formed in the first surface 302. The number and shape of the indentations 306 of FIG. 3B differ from the indentations 106, 206 of FIGS. 1B and 2B based on differences in the size and shape of the pellets 104, 204, 304.

FIG. 4 illustrates an example system 400 for evaluating effectiveness of a shot peening process for a metal part 401 (e.g., the first, second, and/or third metal parts 100, 200, 300 of FIGS. 1A-3B) in accordance with teachings of this disclosure. The metal part 401 can be a component of a production piece such as a stringer of an aircraft. In the example of FIG. 4, a first surface 402 of the metal part 401 has undergone a shot peening process such that a plurality of pellets or beads (e.g., the pellets 104, 204, 304) impacts the first surface 402, forming indentations or dimples 404 in the first surface 402. The metal part 401 can have a different size and/or shape than the example shown in FIG. 4. Also, the indentations 404 of FIG. 4 can have different sizes and/or shapes based on the features of the pellets that impact the surface, the impact velocity, etc.

The example system 400 includes an illumination source 406. The illumination source 406 can include a light emitting diode (LED) or laser light source. The illumination source 406 is coupled to a first support 407. In the example of FIG. 4, the illumination source 406 is positioned at an angle relative to the first surface 402 of the metal part 401. In the example of FIG. 4, the first support 407 to which the illumination source 406 is coupled can be adjusted with respect to height and/or angle of the illumination source 406 relative to the first surface 402. The adjustment of the position of the illumination source 406 can be performed by manual adjustment of the illumination source 406 and/or the first support 407 or via automated adjustments in examples where, for instance, the first support 407 includes a motor.

The illumination source 406 emits a light beam, as represented by arrow 408 in FIG. 4, to illuminate at least a portion of the first surface 402. The example system 400 includes a camera 410 to generate image data of one or more portions of the illuminated first surface 402. The camera 410 is coupled to a second support 409. In the example of FIG. 4, the camera 410 is positioned at an angle relative to the first surface 402 of the metal part 401. In the example of FIG. 4, the second support 409 to which the camera 410 is coupled can be adjusted with respect to height and/or angle of the camera 410 relative to the first surface 402. The adjustment of the position of the camera 410 can be performed by manual adjustment of the camera 410 and/or the second support 409 or via automated adjustments in examples where, for instance, the second support 409 includes a motor. Also, the position and/or shape of the first support 407 and/or the second support 409 can differ from the examples shown in FIG. 4. For instance, the first support 407 may be a hanging support to allow the illumination source 406 to hang from a ceiling of a room in which the first metal part 401 is located.

The camera 410 can include, for example, a high dynamic range camera that takes a plurality of images of the first surface 402 and/or one or more portions thereof. A size of an area of the first surface 402 that is captured by the camera 410 in each image can depend on a size of the field of view of the camera 410, the position of the camera 410 relative to the first surface 402, etc. As disclosed herein, the image data collected by the camera 410 is analyzed to evaluate an effectiveness of the shot peening process.

The illumination source 406 illuminates the first surface 402 to enable the camera 410 to capture the features (e.g., the indentations 404) of the first surface 402 after shot peening with improved accuracy. However, because the first surface 402 of the metal part 401 is metallic, there is a likelihood that the light from the illumination source 406 reflects off of the first surface 402 and causes glare that is captured by the camera 410. Areas of bright light and/or darkness can affect the image(s) captured by the camera 410 and, as a result, affect the analysis of the shot peening by inaccurately representing features of the first surface 402.

To address the possibility of glare, the example system 400 includes one or more features that improve the uniformity of light emitted by the illumination source 406 and reflected by the first surface 402. For example, an angle x of the illumination source 406 relative to the first surface 402 can be selected based on the reflective properties of the metal of the first surface 402. If a value of the angle x is too high, then the light emitted by the illumination source 406 will not be reflected by the first surface 402. If the value of the angle x is too low, then the light may not sufficiently diffuse, thereby affecting the uniformity of the light. Accordingly, the angle x of the illumination source 406 is selected based on the reflective properties of the metal of the first surface 402. Example values of the angle x can include 15°, 25°, or 35°. The reflective properties of the metal can be based on known data for the metal. The angle of the illumination source 406 can be adjusted during set-up of the system 400.

The example system 400 includes a light diffuser 412. The example light diffuser 412 can including a holographic diffuser. The light diffuser 412 facilitates dispersion or scattering of the light from the illumination source 406 onto the first surface 402 of the metal part 401. The scattering of the light via the light diffuser 412 helps to reduce glare and promote uniformity of the distribution of the light from the illumination source 406. As a result of the light emitted by the illumination source 406 and the scattering of the light via the light diffuser 412, an image of the shot peening indentations is reflected onto an image plane of the camera 410 with no glare or substantially little glare. The light diffuser 412 can be coupled to the first support 407 or another support.

As illustrated in FIG. 4, the camera 410 is disposed at an angle y relative to the first surface 402 of the metal part 401 to capture the light reflecting off of the first surface 402. The angle y of the camera 410 can be selected based on variables such as the angle x of the illumination source 406, the reflective properties of the metal of the first surface 402, the distance of the camera 410 from the first surface 402, the field of view of the camera 410, the size of the portion(s) of the first surface 402 for which images are to be collected, etc. Example values of the angle γ can include 15°, 25°, or 35°. The example camera 410 of FIG. 4 includes a polarization filter 414. The polarization filter 414 is disposed in front of a lens of the camera 410. The polarization filter 414 reduces or suppresses glare of the scattered light that reflects off of the first surface 402 of the metal part 401. Thus, as a result of one or more features of the example system 400 (e.g., the angle of the illumination source 406, the light diffuser 412, and/or the polarization filter 414), the light reaches a focal plane of the camera 410 with no glare or substantially little glare.

The example system 400 of FIG. 4 can include additional cameras 410 with corresponding polarization filters 414 to generate image data for multiple portions of the first surface 402 and/or to generate image data for a portion of the first surface 402 from different angles. The camera(s) 410 can include zoom lenses 416 to capture image(s) of the first surface 402 from different distances. Also, the example system 400 can include additional illumination sources 406 to emit light onto the first surface 402. The number of illumination sources 406 can be based on, for instance, the size of the first surface 402 to be imaged, a color of the metal of the first surface 402, etc.

In the example of FIG. 4, the image data generated by the camera 410 is analyzed by a shot peening analyzer 418. The shot peening analyzer 418 can be implemented by one or more processors. The processor(s) can be a processor of the camera 410 or a processor located remotely from the camera 410. In some examples, the shot peening analyzer 418 is implemented by one or more cloud-based devices, such as one or more servers, processors, and/or virtual machines located remotely from the camera(s) 410. The image data generated by the camera 410 is transmitted to the shot peening analyzer 418 via one or more wired or wireless connections.

The example shot peening analyzer 418 analyzes the image data based on, for instance, pixel counts of black and white pixels in the image data. The shot peening analyzer 418 uses the black and white pixel counts to determine an impact coverage value, such as a percentage of coverage of the portion(s) of the first surface 402 with shot peened indentations (e.g., as represented by black pixels in the image data). The example shot peening analyzer 418 compares the impact coverage value to one or more predefined thresholds to determine an effectiveness of the shot peening process with respect to consistency or uniformity of coverage of the first surface 402 after undergoing the shot peening process. The thresholds can be based on, for example, a size of the pellets used to impact the first surface 402 of the metal part 401 and/or an expected depth of penetration of the pellets on the first surface 402. The example shot peening analyzer 418 can output status indicators or alerts indicating whether the portion of the first surface 402 being analyzed satisfies the threshold (i.e., the shot peening process was effective based on the percentage of coverage of the surface portion(s) with shot peened dimples) or does not satisfy the threshold (i.e., the shot peening process was not effective based on the percentage of coverage of the surface portion(s) with shot peened dimples). In some examples, the shot peening analyzer 418 outputs image data such as an image of the first surface 402 to illustrate the area(s) of the first surface 402 that may have been missed during the shot peening process.

Figure 5:
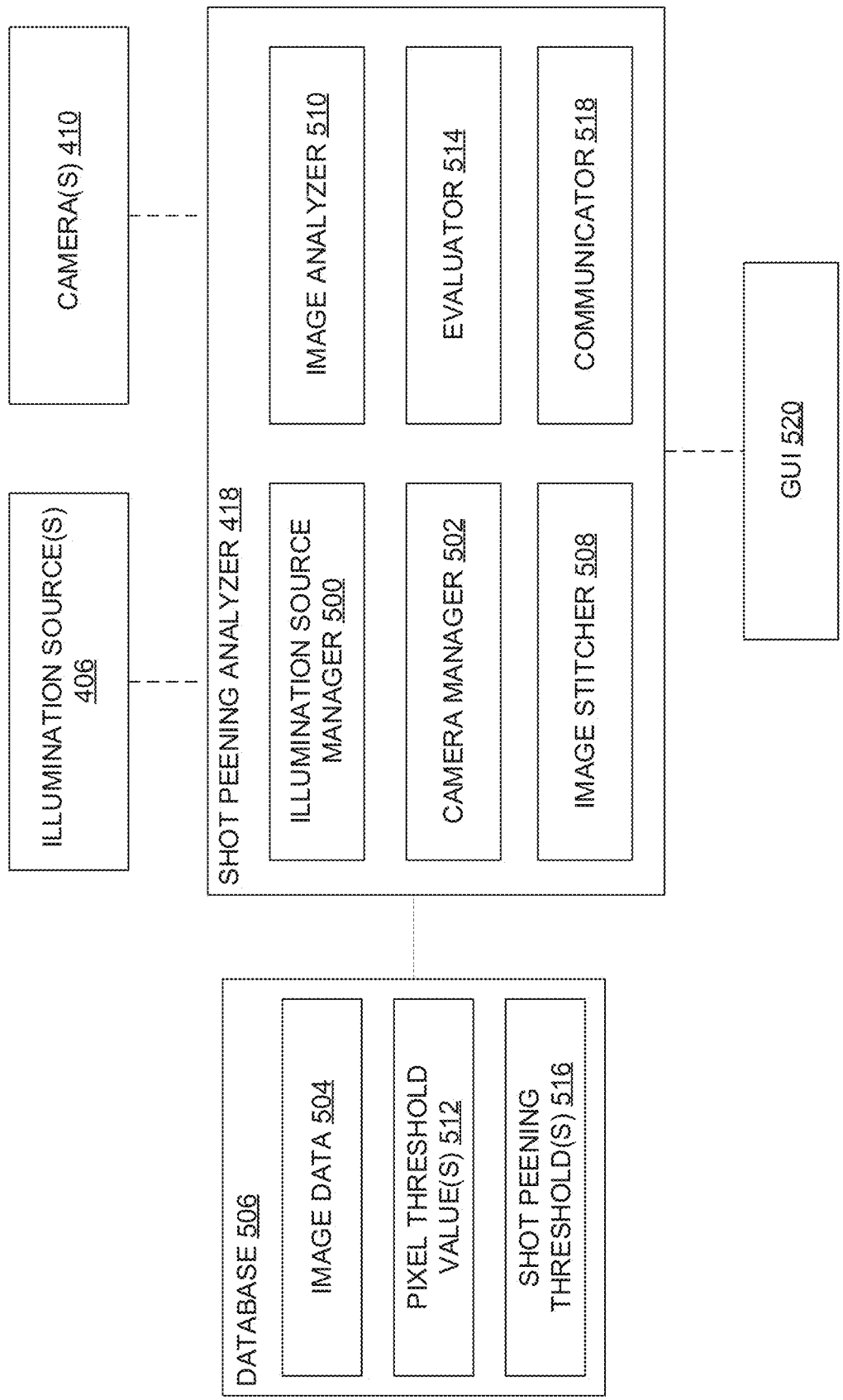
FIG. 5 is a block diagram of an example implementation of the shot peening analyzer of FIG. 4

FIG. 5 is a block diagram of an example implementation of the shot peening analyzer 418 of FIG. 4. The example shot peening analyzer 418 of FIG. 5 includes an illumination source manager 500. The illumination source manager 500 generates instructions that are transmitted to the illumination source(s) 406 (e.g., via wireless transmission) to control operation of the illumination source(s) 406. For example, the illumination source manager 500 controls a duration of time for which the illumination source(s) 406 are activated. In some examples, the illumination source manager 500 can control a position of the illumination source(s) 406 relative to the first surface 402 by controlling motorized support(s) 407 to which the illumination source(s) 406 are coupled. The illumination source manager 500 can control operation of the illumination source(s) 406 based on one or more user inputs.

As discussed above, the camera(s) 410 are communicatively coupled to the shot peening analyzer 418. The example shot peening analyzer 418 includes a camera manager 502. The camera manager 502 controls operation of the camera(s) 410. For example, the camera manager 502 generates instructions that are transmitted to the camera(s) 410 (e.g., via wireless transmission) which cause the camera(s) 410 to capture images of the first surface 402 of the metal part 401. The instructions generated by the camera manager 502 can control variables such as a number of images captured by the camera(s) 410. In some examples, the camera manager 502 can control a position of the camera(s) 410 relative to the first surface 402 by controlling motorized support(s) 409 to which the camera(s) 410 are coupled. The camera manager 502 can control operation of the camera(s) 410 based on one or more user inputs.

In other examples, one or more of the illumination source manager 500 and/or the camera manager 502 are implemented by processor(s) different than a processor implementing the shot peening analyzer 418. For example, the illumination source manager 500 can be implemented by a processor associated with the illumination source 406 of FIG. 4. As another example, the camera manager 502 can be implemented by a processor of the camera 410 of FIG. 4. Thus, in some such examples, the camera 410 is activated via the camera manager 502 based on one or more user input(s) received by the processor of the camera 410.

In the example of FIG. 5, image data 504 is transmitted from the camera(s) 410 to shot peening analyzer 418. The image data 504 is stored in a database 506. In some examples, the shot peening analyzer 418 includes the database 506. In other examples, the database 506 is located external to the shot peening analyzer 418 in a location accessible to the shot peening analyzer 418 as shown in FIG. 5. The example shot peening analyzer 418 can receive the image data 504 in substantially real-time as the image data is generated by the camera(s) 410 (e.g., within milliseconds). In other examples, the image data 504 is stored at the camera(s) 410 for a period of time and transferred to the shot peening analyzer 418 at a later time (e.g., based on user input(s)).

The example shot peening analyzer 418 of FIG. 5 includes an image stitcher 508. In some examples, the image data 504 is generated for one or more portions of the first surface 402 of the metal part 401. For example, the camera 410 of FIG. 4 can capture image data for a first portion of the first surface 402 and a second portion of the first surface 402 adjacent the first portion. The image data for the first and second portions can be generated by adjusting a position of the camera 410 relative to the first surface 402 and/or by adjusting a position of the first surface 402 relative to the camera 410. In other examples, image data for two or more portions of the first surface 402 is generated by two or more cameras 410 positioned at different locations relative to the first surface 402.

The image stitcher 508 of the example shot peening analyzer 418 of FIG. 5 combines or merges the image data 504 generated by the camera(s) 410 for two or more portions of the first surface 402 that are at least partially overlapping with respect to the fields of view of the camera(s) 410 capturing the images. To merge multiple images, the image stitcher 508 uses feature detection algorithm(s) to detect and match features between images. The example image stitcher 508 determines an amount of overlap between two adjacent images and blends the images to create, for example, a panorama. The image stitcher 508 can process the merged image data with respect to, for instance, color correction to facilitate a smooth transition from individual images to merged images. Thus, by stitching together image data 504 generated for different (e.g., adjacent) portions of the first surface 402, the image stitcher 508 facilitates analysis of a greater area of the first surface 402 than the naked eye or a microscope. In particular, combining image data captured through the field(s) of view of one or more camera(s) 410 for multiple portions of the first surface 402 enables inspection of a larger area of the shot peened surface 402 with greater feature identification as compared to the small areas of inspection viewable in detail via a microscope or the human eye. Further, the image data 504 enables inspection of area(s) of the shot peened surface 402 that may not be readily viewable via the naked eye or a microscope but can be viewed via the camera(s) 410.

In some examples, the image data 504 generated by the camera(s) 410 and transmitted to the shot peening analyzer 418 is for one portion of the first surface 402 or for the first surface 402 in its entirety. In such examples, the image stitcher 508 does not combine the image data 504. The image stitcher 508 can determine whether or not to stitch the image data 504 by, for example, detecting that the image data has been received from two or more cameras 410 positioned adjacent one another and/or based on user input(s).

The example shot peening analyzer 418 of FIG. 5 includes an image analyzer 510. The image analyzer 510 analyzes the image data 504 (e.g., the merged image data 504, the image data 504 for a portion of the first surface 402) with respect to the number of pixels in the image data 504. In some examples, the camera(s) 410 generate grayscale image(s) of the first surface 402 of the metal part 401 in which the pixel values correspond to an amount or intensity of light. In such examples, the image analyzer 510 performs a thresholding process on the image data 504 to generate binary image data. For example, the image analyzer 510 replaces each pixel in a grayscale image with a black pixel if the pixel value is less than a pixel value threshold 512 and a white pixel if the pixel value is greater than the pixel value threshold 512. The pixel value threshold 512 can be predefined based on user input(s) and stored in the database 506. For example, for a 256 grayscale image, a pixel value threshold of 10% would correspond to a grayscale level of 26. Pixel values above or below the grayscale pixel level can be replaced accordingly to create the black and white images. The pixel value threshold can be adjusted based on the level of the 256 grayscale for which the threshold is to be set.

The image analyzer 510 of the example shot peening analyzer 418 of FIG. 5 analyzes the binary image data for the first surface 402 and/or one or more portions thereof. For example, the image analyzer 510 counts the number of white pixels and the number of black pixels in the image data 504 after thresholding. In the example of FIG. 5, the white pixels can represent areas of the first surface 402 that have not been impacted by the pellets during shot peening. The black pixels can represent areas of the first surface 402 that have been impacted by the pellets during shot peening, or areas including indentations or dimples.

The example shot peening analyzer 418 of FIG. 5 includes an evaluator 514. The evaluator 514 calculates an impact coverage value for the surface 402 and/or the portion(s) thereof. The impact coverage value can include a percentage of coverage of the first surface 402 (and/or portion(s) thereof) with indentations or dimples due to the shot peening process based on the binary pixel count data generated by the image analyzer 510. The evaluator 514 compares the impact coverage value (e.g., the percentage of coverage) to a predefined shot peening threshold 516. Based on the comparison of the impact coverage value of the first surface 402 (and/or portion(s) thereof) to the threshold 516, the evaluator 514 determines an effectiveness of the shot peening process for the first surface 402.

For example, if the percentage of coverage for the first surface 402 (and/or portion(s)) thereof is less than the predefined shot peening threshold 516, then the evaluator 514 determines that the shot peening process resulting in inconsistent or substantially nonuniform coverage of the first surface 402, as the first surface 402 includes areas that were not impacted or not substantially impacted by the pellets. Thus, the evaluator 514 determines that the shot peening process was not effective. If the percentage of coverage satisfies the shot peening threshold 516, then the evaluator 514 determines that the shot peening process was effective with respect to impact coverage of the first surface 402 (or portion(s) thereof) by the pellets.

The shot peening threshold(s) 516 can be based on reference data, such as test data obtained by performing a shot peening process on a sample of the material of the first surface 402 of the metal part 401, such as an Almen strip that can be evaluated using an Almen gage. The shot peening threshold(s) 516 can be based on the shape and/or size of the pellets that are to impact the first surface 402 and/or predefined data such as an expected impact velocity. The shot peening threshold(s) 516 can represent a preferred coverage value (e.g., percentage) for a portion of the first surface 402 and/or a preferred coverage value for the first surface 402 as a whole. For instance, an example shot peening threshold can have a value of 10%, indicating that 10% of a portion of the first surface 402 should be covered via shot peening. Thus, in the example of FIG. 5, the analysis performed by the evaluator 514 with respect to effectiveness of a shot peening process can be customized based on characteristics of the metal to be shot peened and/or feature(s) of the shot peening process, such as pellet size.

In some examples, the evaluator 514 analyzes the pixel count data and identifies portions in the image(s) corresponding to the first surface 402 that are associated with a high percentage of white pixels as compared to black pixels. The evaluator 514 can flag these portions as indicative of areas of the first surface 402 that may have been missed being impacted by the pellets during the shot peening process.

The example shot peening analyzer 418 of FIG. 5 includes a communicator 518. The communicator 518 generates one or more outputs regarding the effectiveness of the shot peening process for the first surface 402 of the metal part 401 for presentation via, for instance, a graphical user interface (GUI) 520. The output(s) can include, for instance, visual and/or audio output(s) that indicate whether the impact coverage value meets the shot peening threshold 516 or fails to satisfy the threshold. The output(s) can include pass/fail indicator(s), green/red symbol(s), audio alert(s), etc.

In some examples, the communicator 518 output(s) image data for display via the GUI 520. The image data can include the grayscale image(s) generated by camera(s) 410, the black and white binary pixel image(s) generated by the image analyzer 510 after performing the thresholding, and/or illustrative depiction(s) of the first surface 402 (e.g., a representative model of the first surface 402). Based on the identification of the area(s) of the first surface 402 associated with a high percentage of white pixels as compared to black pixels in the image data by the evaluator 514, the image(s) output by the communicator 518 can include label(s), marking(s), highlighting, etc. to visually identify the area(s) of the first surface 402 that may require additional shot peening. Thus, the example shot peening analyzer 418 can assist manufacturers in identifying area(s) of the first surface 402 for which the shot peening process may need to be repeated. The effectiveness analysis performed by the shot peening analyzer 418 can be performed based on image data generated after the shot peening process has been repeated for the area(s) of the first surface 402 to track changes in coverage of the first surface 402 with the indentations 404.

Figure 6A:
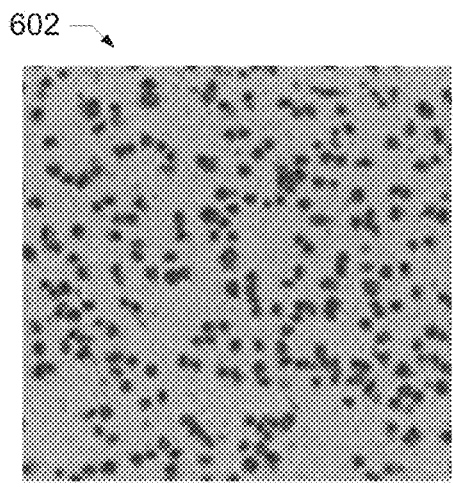
FIGS. 6A-8B depict example images of a shot peened surface generated in accordance with teachings disclosed herein.
Figure 6B:
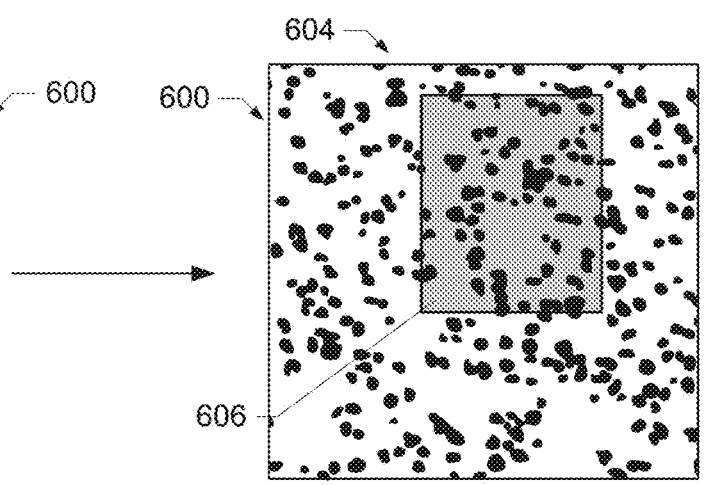

FIGS. 6A-8B depict example image data corresponding to a portion 600 of the first surface 402 of the metal part 401 that has been shot peened one or more times. FIG. 6A illustrates a first grayscale image 602 for the portion 600 of the first surface 402 generated by the camera(s) 410 of FIG. 4. FIG. 6B illustrates a first binary image 604 generated by the image analyzer 510 of the example shot peening analyzer 418 of FIG. 5 based on the first grayscale image 602 of FIG. 6A. In the example of FIG. 6B, the white portions of the first binary image 604 correspond to areas of the portion 600 of the first surface 402 that have not been impacted by or not significantly impacted by pellets during the shot peening process. As shown in FIG. 6B, the first binary image 604, which can be output by the communicator 518 for display via the GUI 520, includes a marking 606 to alert a user to an area of the first surface 402 that has low dimple coverage.

Figure 7A:
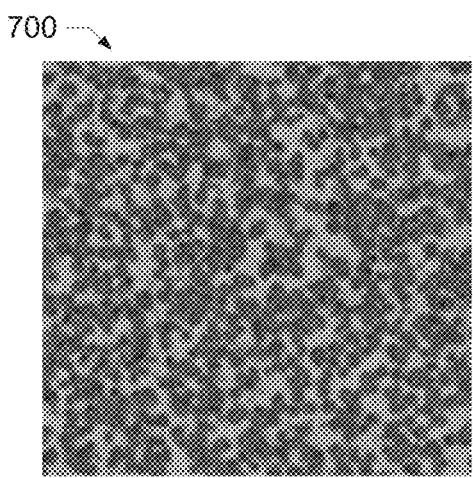
Figure 7B:
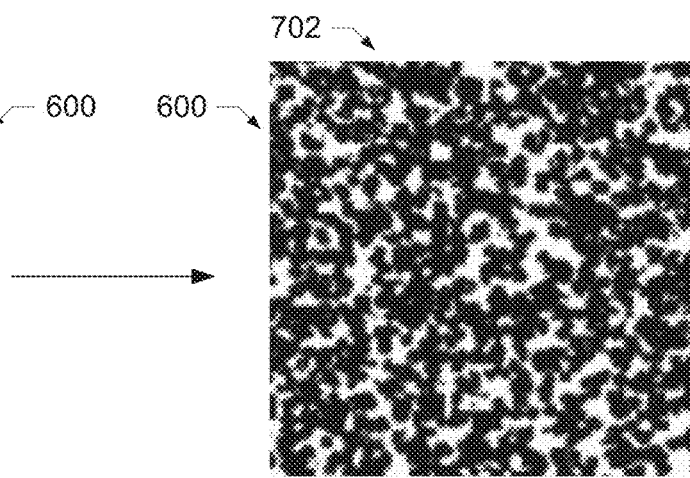

Based on the marking 606, the user may repeat the shot peening process for the portion 600 of the first surface 402. FIG. 7A illustrates a second grayscale image 700 for the portion 600 of the first surface 402 generated by the camera(s) 410 of FIG. 4 after the portion 600 has undergone three additional shot peening processes (i.e., four rounds of impact by the pellets on the portion 600). FIG. 7B illustrates a second binary image 702 generated by the image analyzer 510 of the example shot peening analyzer 418 of FIG. 5 based on the second grayscale image 700 of FIG. 7A. As shown in FIG. 7B, the second binary image 702 includes fewer areas of white pixels than the first binary image 604 of FIG. 6A, indicating increased coverage of the portion 600 of the first surface 402 with indentations or dimples due to impact of the pellets on the portion 600.

Figure 8A:
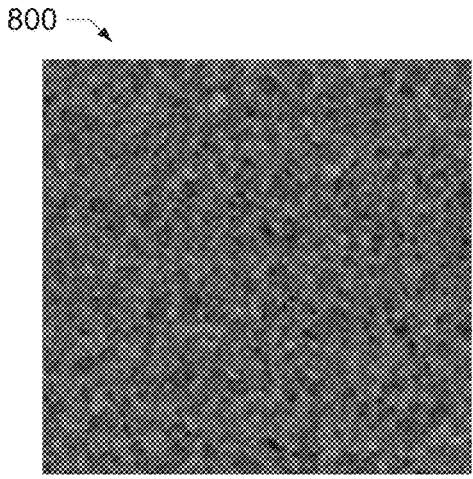
Figure 8B:
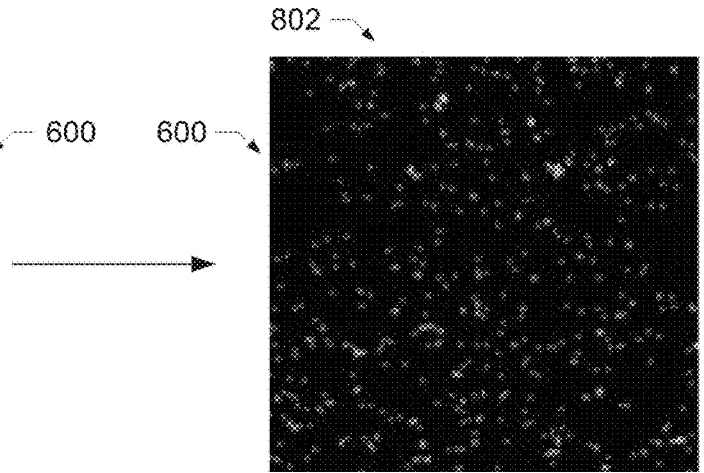

The user may repeat the shot peening process for the portion 600 of the first surface 402 additional times. FIG. 8A illustrates a third grayscale image 800 for the portion 600 of the first surface 402 generated by the camera(s) 410 of FIG. 4 after the portion 600 has been exposed to the pellets eight times the passes as in FIGS. 7A and 7B (i.e., thirty-two rounds of impact by the pellets on the portion 600). FIG. 8B illustrates a third binary image 802 generated by the image analyzer 510 of the example shot peening analyzer 418 of FIG. 5 based on the second grayscale image 800 of FIG. 8A. As shown in FIG. 8B, the second binary image 802 includes significantly fewer white pixel portions than the first binary image 604 of FIG. 6B and the second binary image 702 of FIG. 7B, indicating substantially complete coverage of the portion 600 of the first surface 402 with indentations or dimples due to impact of the pellets on the portion 600.

While an example manner of implementing the shot peening analyzer 418 of FIG. 4 is illustrated in FIG. 5, one or more of the elements, processes and/or devices illustrated in FIG. 5 may be combined, divided, re-arranged, omitted, eliminated and/or implemented in any other way. Further, the example illumination source manager 500, the example camera manager 502, the example image stitcher 508, the example image analyzer 510, the example evaluator 514, the example communicator 518 and/or, more generally, the example shot peening analyzer 418 of FIG. 5 may be implemented by hardware, software, firmware and/or any combination of hardware, software and/or firmware. Thus, for example, any of the example illumination source manager 500, the example camera manager 502, the example image stitcher 508, the example image analyzer 510, the example evaluator 514, the example communicator 518 and/or, more generally, the example shot peening analyzer 418 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example illumination source manager 500, the example camera manager 502, the example image stitcher 508, the example image analyzer 510, the example evaluator 514, the example communicator 518 is/are hereby expressly defined to include a non-transitory computer readable storage device or storage disk such as a memory, a digital versatile disk (DVD), a compact disk (CD), a Blu-ray disk, etc. including the software and/or firmware. Further still, the example shot peening analyzer 418 of FIG. 5 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
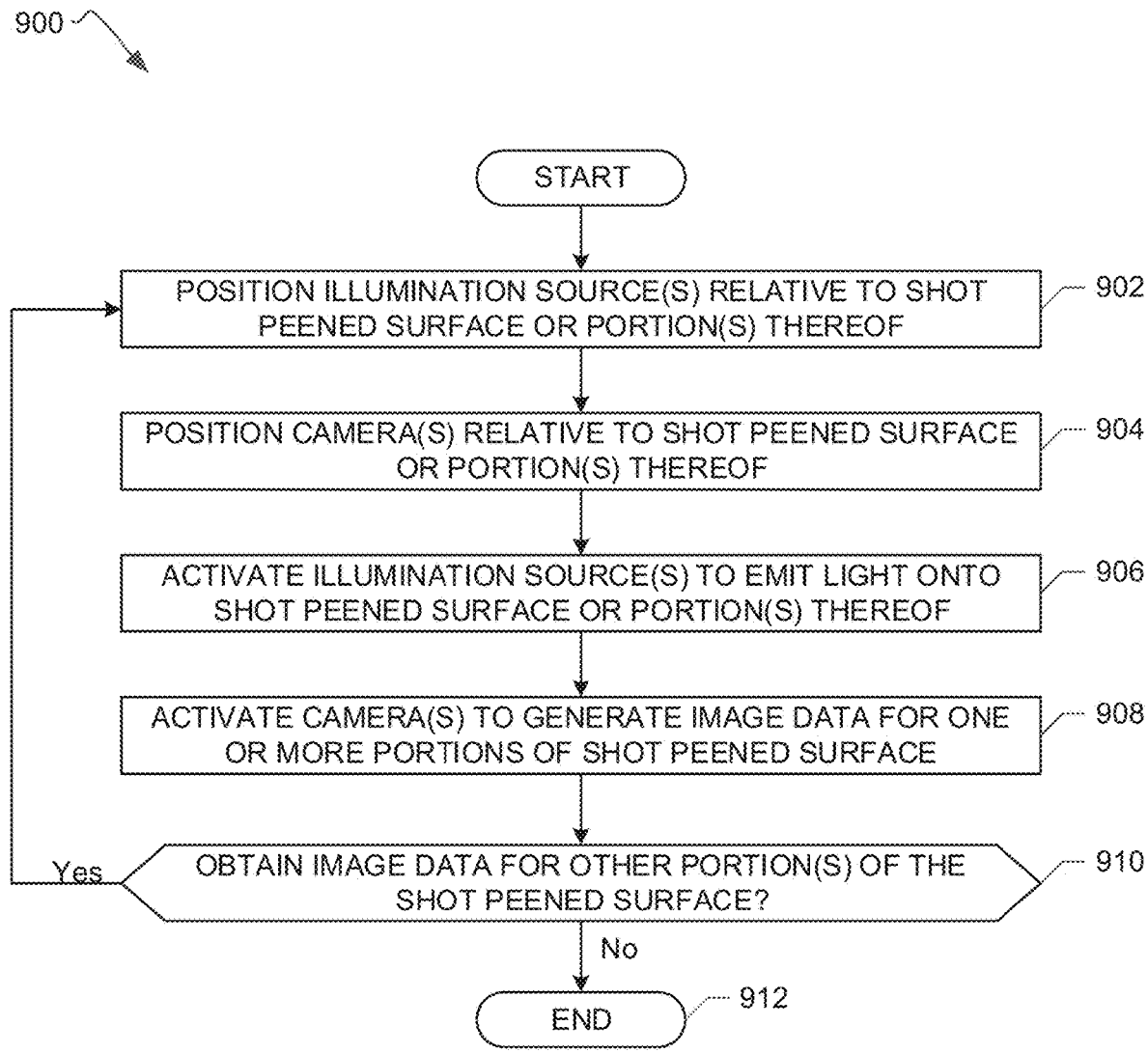
FIG. 9 is a flowchart of an example method to generate image data to evaluate a shot peened surface.

FIG. 9 is a flowchart of an example method 900 for generating image data of a surface that has undergone shot peening. One or more blocks of the example method 900 may be implemented by a processor executing the example shot peening analyzer 418 of FIGS. 4 and/or 5.

The example method 900 begins with positioning one or more illumination sources relative to a shot peened surface or one or more portions of the shot peened surface (block 902). For example, an angle of the illumination source 406 of the example system 400 of FIG. 4 can be adjusted based on reflective properties of the metallic material of the first surface 402 of the metal part 401 to facilitate diffusion of the light emitted by the illumination source 406. In some examples, the illumination source 406 includes the light diffuser 412 (e.g., a holographic diffuser) to further facilitate diffusion of the light and reduce glare. As another example, a height of the first support 407 to which the illumination source 406 is coupled can be adjusted to position the illumination source 406. In the example of FIG. 9, the positioning of the illumination source(s) can be performed via manual or automated adjustments.

The example method 900 includes positioning one or more cameras relative to the shot peened surface or one or more portions thereof (block 904). For example, an angle of the camera 410 of FIG. 4 can be adjusted based on the field of view of the camera lens, the portion(s) of the first surface 402 to captured via image(s), the reflective properties of the material of the first surface 402, the position of the illumination source(s) 406, etc. In some examples, the camera 410 includes the polarization filter 414 to reduce glare from the light emitted by the illumination source(s) 406. As another example, a height of the second support 409 to which the camera 410 is coupled can be adjusted to position the camera 410. In the example of FIG. 9, the positioning of the camera(s) can be performed via manual or automated adjustments The example method 900 includes activating the illumination source(s) to emit light onto the shot peened surface or one or more portions thereof (block 906). For example, in response to a user input (e.g., via the GUI 520), the illumination source manager 500 of the example shot peening analyzer 418 of FIG. 5 generates instructions that are transmitted to the illumination source(s) 406 to control operation of the illumination source(s) 406. As mentioned above, the illumination source manager 500 can be implemented by the processor(s) implementing the shot peening analyzer 418 or other processor(s) (e.g., dedicated processor(s) for the illumination source(s) 406).

The example method 900 includes activating the camera(s) to generate image data for one or more portions of the shot peened surface (block 908). For example, in in response to a user input, the camera manager 502 of the example shot peening analyzer 418 of FIG. 5 generates instructions that are transmitted to the camera(s) 410 to control operation of the camera(s) 410. As mentioned above, the camera manager 502 can be implemented by the processor(s) implementing the shot peening analyzer 418 or other processor(s) (e.g., dedicated processor(s) for the camera(s) 410).

In the example method 900, if image data is to be obtained for one or more other portions of the shot peened surface (block 910), the example method 900 returns to positioning the illumination source(s) and/or camera(s) relative to the portion(s) of the shot peened surface for which image data is to be obtained as needed based on the current position of the illumination source(s) and/or camera(s) relative to shot peened surface (blocks 902-908). The example method ends when no further image data is to be obtained (block 912).

Figure 10:
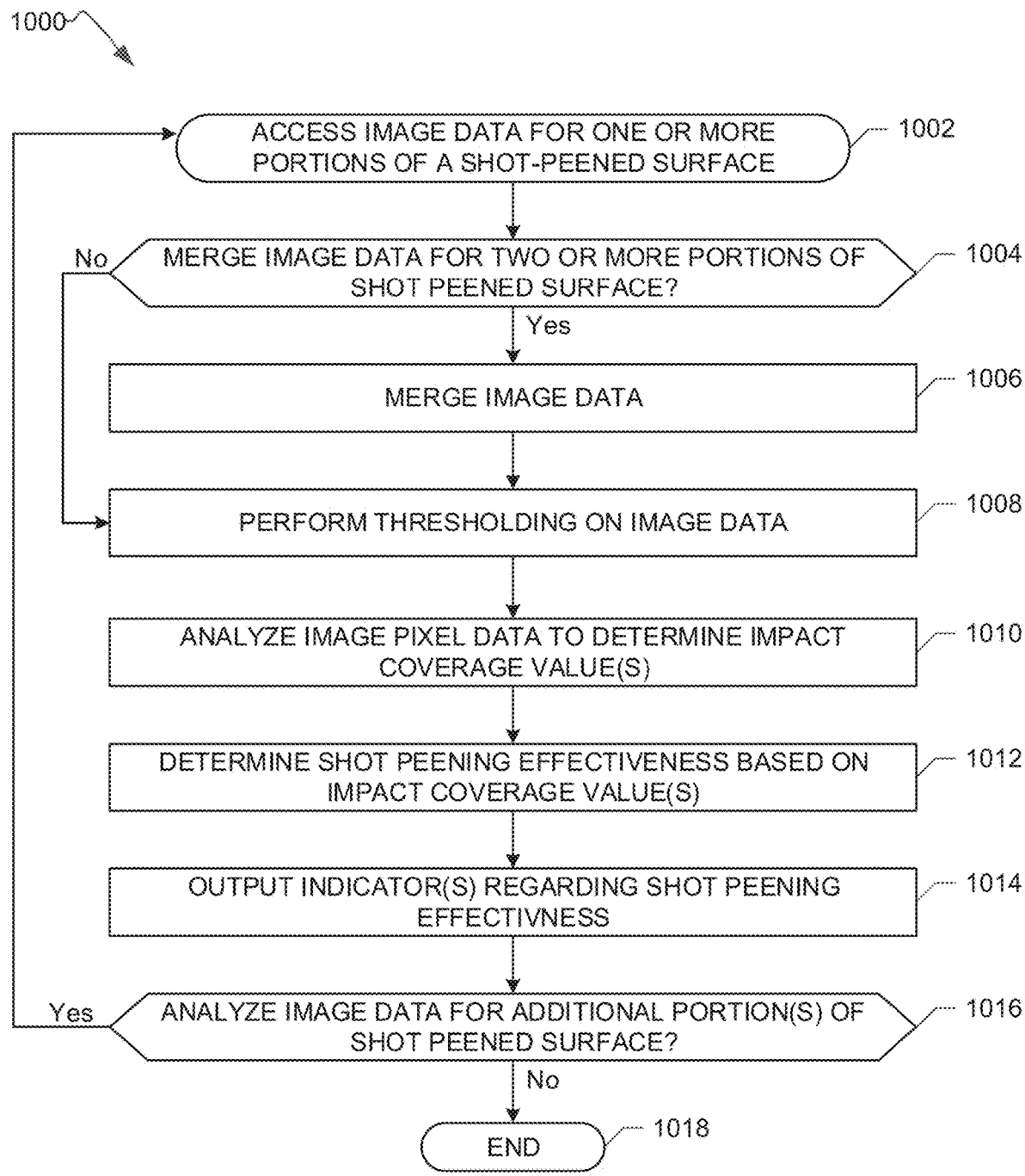
FIG. 10 is a flowchart representative of example machine readable instructions which may be executed to implement the example shot peening analyzer of FIGS. 4 and 5.

A flowchart representative of example hardware logic, machine readable instructions, hardware implemented state machines, and/or any combination thereof for implementing the example shot peening analyzer 418 of FIGS. 4 and/or 5 is shown in FIG. 10. The machine readable instructions may be an executable program or portion of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 10, many other methods of implementing the example shot peening analyzer 418 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 10 is a flowchart of an example method 1000 to evaluate an effectiveness of a shot peening process. The example method 1000 of FIG. 10 can be implemented by the example shot peening analyzer 418 of FIGS. 4 and/or 5.

The example method 1000 of FIG. 10 begins with accessing image data for one or more portions of a surface that has been shot peened (block 1002). For example, the shot peening analyzer 418 receives image data 504 from the camera(s) 410 of the example system 400 of FIG. 4 corresponding to image(s) captured by the camera(s) 410 for one or more portions of the shot-peened first surface 402 of the metal part 401.

The example method 1000 determines whether image data for two or more portions of the shot peened surface should be merged (block 1004). In some examples, the camera(s) 410 capture images of adjacent portions of the first surface 402. In such examples, a decision is made to merge the image data to analyze a greater area of the shot-peened surface than may be captured in one image based on a size of a field of view of the camera (block 1006). For example, the image stitcher 508 of the example shot peening analyzer of FIG. 5 merges image data generated for two or more portions of the first surface 402 by the camera(s) 410.

The example method 1000 includes performing a thresholding process on the image data to convert grayscale images that measure intensity of light to binary image data including black and white pixels (block 1008). For example, the image analyzer 510 of the example shot peening analyzer 418 of FIG. 5 replaces each pixel in the grayscale image data 504 with a black pixel if the pixel value is less than a pixel value threshold 512 stored in the database 506 and a white pixel if the pixel value is greater than the pixel value threshold 512.

The example method 1000 includes analyzing the image pixel data to determine impact coverage value(s) for the shot peened surface, or value(s) indicative of an amount of the surface that has been impacted by the pellets (block 1010). For example, image analyzer 510 counts the number of white pixels and the number of black pixels in the image data 504 after thresholding, where the black pixels represent indentations or dimples formed in the first surface 402 as a result of shot peening and the white pixels represent area(s) of the first surface 402 that were not impacted during shot peening. The evaluator 514 of the example shot peening analyzer 418 calculates a percentage of coverage of the first surface 402 (and/or portion(s) thereof) with indentations based on the pixel counts.

The example method 1000 includes determining an effectiveness of the shot peening process based on the impact coverage value(s) (block 1012). For example, the evaluator 514 of FIG. 5 compares the percentage of coverage value(s) calculated for the portion(s) of the first surface 402 to a predefined shot peening threshold 516 to determine the effectiveness of the shot peening process for the first surface 402 (and/or portion(s) thereof). For example, if the percentage of coverage for the first surface 402 (and/or portion(s) thereof) is less than the predefined shot peening threshold 516, then the evaluator 514 determines that the shot peening process was not effective, as the first surface 402 (or a portion thereof) includes areas that were not impacted or not substantially impacted. If the percentage of coverage for the first surface 402 (and/or portion(s) thereof) satisfies the threshold 516, the evaluator 514 determines that the shot peening process was effective with respect to consistent or uniform impact of the first surface 402 and formation of the dimples. The shot peening threshold 516 can be based on, for instance, the type of pellets used to impact the first surface 402 (e.g., the pellets 104, 204, 304 of FIGS. 1A, 2A, 3A), the type of material of the first surface 402, etc.

The example method 1000 includes outputting one or more indicators representative of the effectiveness of the shot peening process (block 1014). For example, the communicator 518 of the example shot peening analyzer 418 can transmit one or more alerts, symbols, etc. for display via the GUI 520 that indicates whether or not the shot peening process was effective in uniformly impacting the first surface 402. In some examples, the output(s) include image(s) of the first surface 402 (e.g., the images captured by the camera(s) 410 and/or representative depictions based on the image data) to visually present the coverage of the first surface 402 and/or to flag area(s) for which the shot peening process may need to be repeated (e.g., as in the example of FIG. 6B).

The example method 1000 continues to analyze image for additional portion(s) of the shot peened surface to evaluate the effectiveness of the shot peening process (block 1016). The example method 1000 ends when there is no further image data to analyze (block 1018).

Figure 11:
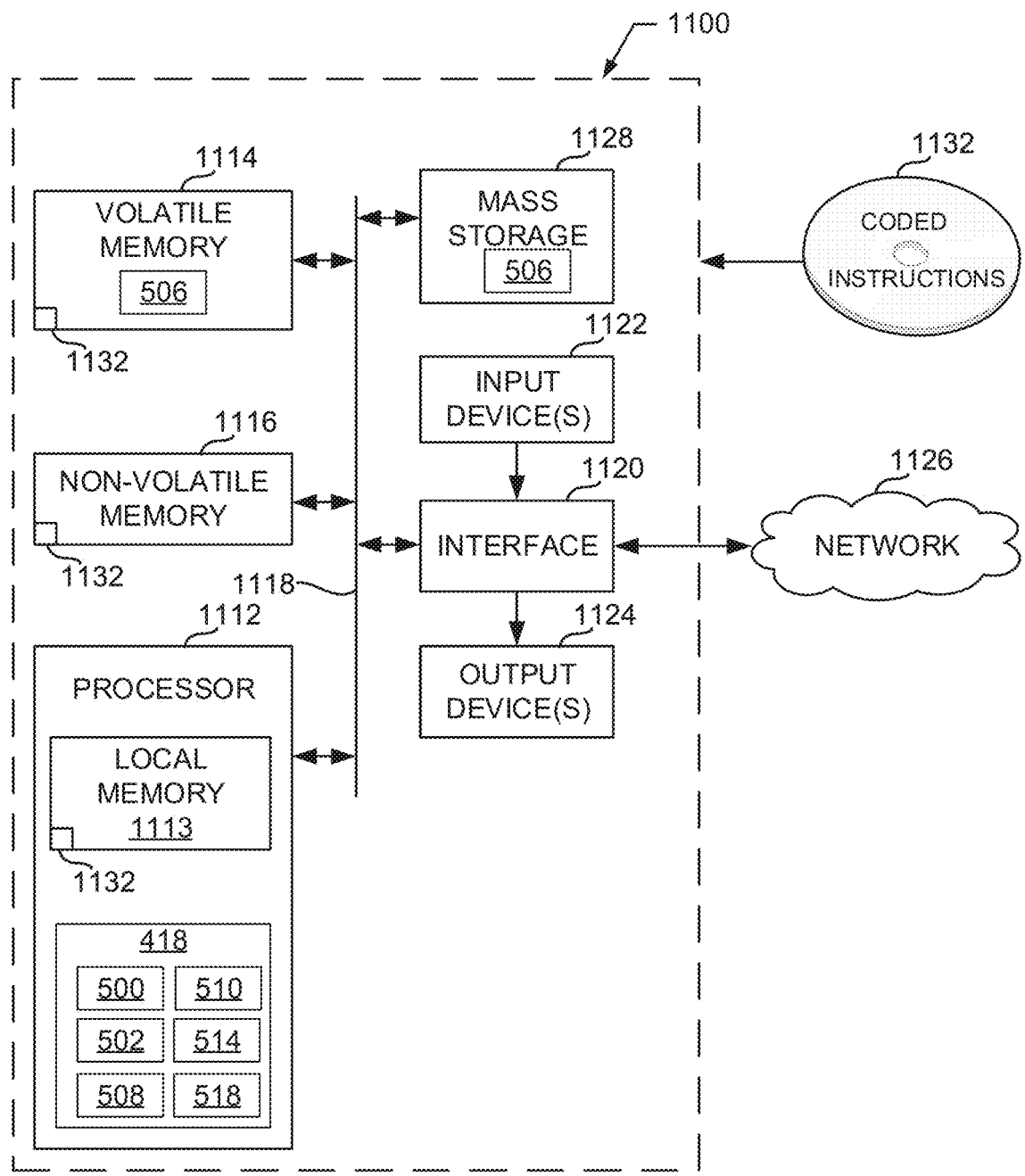
FIG. 11 is a block diagram of an example processing platform structured to execute the instructions of FIG. 10 to implement the example shot peening analyzer of FIGS. 4 and 5.

FIG. 11 is a block diagram of an example processor platform 1100 capable of executing instructions to implement the method of FIG. 10 and/or to implement the shot peening analyzer 418 of FIGS. 4 and/or 5. The processor platform 1100 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example illumination source manager 500, the example camera manager 502, the example image stitcher 508, the example image analyzer 510, the example evaluator 514, and the example communicator 518.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

Coded instructions 1132 of FIG. 11 may be stored in the mass storage device 1128, in the volatile memory 1114, in the non-volatile memory 1116, and/or on a removable non-transitory computer readable storage medium such as a CD or DVD.

From the foregoing, it will be appreciated that example apparatus, methods, and systems have been disclosed herein to objectively evaluate the effectiveness of a shot peening process for a surface that has been shot peened. Example disclosed herein use image data to determine coverage of the surface with indentations that are indicative of impact by pellets on the surface during the shot peening process. Based on the surface coverage, examples disclosed herein evaluate effectiveness of the shot peening process with respect to consistency or uniformity of the coverage. Unlike known examples in which assessment of the shot peening process was performed by a user manually inspecting the shot peened surface with his or her naked eye, disclosed examples use rules to automatically determine effectiveness of the shot peening process based on, for instance, pixel values in the image data and predefined thresholds. Further, disclosed examples facilitate evaluation of larger portions of the shot peened surface via one or more digital images as compared to known examples involving inspection of a small sample of a shot peened material with a microscope or a gage and/or that rely on human eyesight capabilities.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

An example apparatus disclosed herein for evaluating a surface that has undergone a shot peening process includes a camera to generate first image data of a first portion of the surface and a processor. The processor is to determine an impact coverage value for the first portion based on the first image data and determine an effectiveness of the shot peening process for the surface based on the impact coverage value.

In some examples, the processor is to determine the effectiveness by comparing the impact coverage value to a threshold.

In some examples, the camera is to generate second image data for a second portion of the surface and the processor is to merge the first image data and the second image data to generate merged image data, determine the impact coverage value based on the merged image data, and determine the effectiveness based on the impact coverage value for the merged image data.

In some examples, the image data includes grayscale image data and the processor is to convert the grayscale image data to binary image data. In some such examples, the processor is to determine the impact coverage value based on the binary image data.

In some examples, the camera includes a polarization filter.

In some examples, the apparatus further includes an illumination source to emit a light on the surface and a diffuser to diffuse the light. In some such examples, the illumination source is disposed at an angle relative to the surface.

Another example apparatus disclosed herein includes an image analyzer to generate pixel data based on image data received from a camera. The image data is representative of at least a portion of a surface that has undergone a shot peening process. The example apparatus includes an evaluator to perform a comparison of the pixel data to a threshold. The example apparatus includes a communicator to output an indicator of an effectiveness of the shot peening process relative to the at least the portion of the surface based on the comparison.

In some examples, the pixel data include first pixel count data for a plurality of first pixels and second pixel count data for a plurality of second pixels. In some such examples, the evaluator is to determine an impact coverage value for the at least the portion based on the first pixel count data and the second pixel count data and perform the comparison of the impact coverage value to the threshold.

In some examples, the threshold is based on one or more of a material of the surface, a shape of a pellet used to impact the surface during the shot peening process, or a size of the pellet.

In some examples, the image data is for a first portion of the surface and a second portion of the surface and the apparatus further includes an image stitcher to generate the image data by merging first image data for the first portion and second image data for the second portion.

In some examples, the indicator includes an image of the at least the portion of the surface.

In some examples, the apparatus further includes a camera manager to control operation of the camera to generate the image data.

An example method disclosed herein includes analyzing, by executing an instruction with a processor, image data for one or more portions of a surface that has undergone a shot peening process; determining, by executing an instruction with the processor, an impact coverage value for the one or more portions of the surface based on the image data; and determining, by executing an instruction with the processor, a uniformity of a coverage of the one or more portions of the surface during the shot peening process based on the impact coverage value.

In some examples, the method further includes converting the image data from grayscale image data to binary image data.

In some examples, the method further includes combining first image data for a first one of the portions of the surface and second image data for a second one of the portions of the surface.

In some examples, the method further includes identifying an area of low coverage of one or more portions of the surface based on pixel data for the image data.

In some examples, the method further includes generating pixel count data based on the image data. In such examples, the determining of the impact coverage value is to be based on pixel count data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for evaluating a surface that has undergone a shot peening process, the apparatus comprising:
   a camera to generate first image data of a first portion of the surface; and
   a processor to:
      replace respective first ones of pixels in the first image data having a corresponding pixel value exceeding a pixel value threshold with a first binary pixel;
      replace respective second ones of pixels in the first image data having a corresponding pixel value below the pixel value threshold with a second binary pixel;
      determine an impact coverage value for the first portion of the surface based on the first binary pixels and the second binary pixels; and
      determine an effectiveness of the shot peening process for the surface based on the impact coverage value.

2. The apparatus of claim 1, wherein the processor is to determine the effectiveness by comparing the impact coverage value to a coverage threshold.

3. The apparatus of claim 2, wherein the coverage threshold is based on one or more of a material of the surface, a shape of a pellet used to impact the surface during the shot peening process, or a size of the pellet.

4. The apparatus of claim 1, wherein the camera is to generate second image data for a second portion of the surface and the processor is to:
   merge the first image data and the second image data to generate merged image data;
   determine the impact coverage value based on the merged image data; and
   determine the effectiveness based on the impact coverage value for the merged image data.

5. The apparatus of claim 1, wherein the first image data includes grayscale image data, the pixel value threshold to be defined based on a grayscale level of the first image data.

6. The apparatus of claim 1, wherein the camera includes a polarization filter.

7. The apparatus of claim 1, further including:
   an illumination source to emit a light on the surface; and
   a diffuser to diffuse the light.

8. The apparatus of claim 7, wherein the illumination source is disposed at an angle relative to the surface.

9. The apparatus of claim 1, wherein the processor is to determine the impact coverage value based on a count of the first binary pixels and the second binary pixels.

10. An apparatus comprising:
    an image analyzer to generate pixel data based on image data received from a camera, the image data representative of at least a portion of a surface that has undergone a shot peening process, the image analyzer to generate the pixel data by:
       converting respective first ones of pixels in the image data to a first binary pixel in response to corresponding pixel values of the respective first ones of the pixels exceeding a pixel value threshold; and
       converting respective second ones of pixels in the image data to a second binary pixel in response to corresponding pixel values of the respective second ones of the pixels being below the pixel value threshold;
    an evaluator to perform a comparison of the pixel data to a coverage threshold; and a communicator to output an indicator of an effectiveness of the shot peening process relative to the at least the portion of the surface based on the comparison.

11. The apparatus of claim 10, wherein the pixel data includes first pixel count data for the first binary pixels and second pixel count data for the second binary pixels.

12. The apparatus of claim 11, wherein the evaluator is to:
determine an impact coverage value for the at least the portion of the surface based on the first pixel count data and the second pixel count data; and
perform the comparison of the impact coverage value to the coverage threshold.

13. The apparatus of claim 10, wherein the coverage threshold is based on one or more of a material of the surface, a shape of a pellet used to impact the surface during the shot peening process, or a size of the pellet.

14. The apparatus of claim 10, wherein the image data includes first image data for a first portion of the surface and second image data for a second portion of the surface and further including an image stitcher to merge first image data for the first portion and second image data for the second portion.

15. The apparatus of claim 10, wherein the indicator includes an image of the at least the portion of the surface.

16. The apparatus of claim 10, further including a camera manager to control operation of the camera to generate the image data.

17. A method comprising:
analyzing, by executing an instruction with a processor, image data for one or more portions of a surface that has undergone a shot peening process;
replacing, by executing an instruction with the processor, respective first ones of pixels in the image data having a corresponding pixel value exceeding a pixel value threshold with a first binary pixel;
replacing, by executing an instruction with the processor, respective second ones of pixels in the image data having a corresponding pixel value below the pixel value threshold with a second binary pixel;
determining, by executing an instruction with the processor, an impact coverage value for the one or more portions of the surface based on the first binary pixels and the second binary pixels; and
determining, by executing an instruction with the processor, a uniformity of a coverage of the one or more portions of the surface during the shot peening process based on the impact coverage value.

18. The method of claim 17, further including combining first image data for a first one of the portions of the surface and second image data for a second one of the portions of the surface.

19. The method of claim 17, further including identifying an area of low coverage of one or more portions of the surface based on the first binary pixels and the second binary pixels.

20. The method of claim 17, further including generating pixel count data based on the first binary pixels and the second binary pixels, the determining of the impact coverage value to be based on pixel count data.

* * * * *